United States Patent [19]

Kurokawa et al.

[11] 4,009,080
[45] Feb. 22, 1977

[54] METHOD OF TREATING WASTE COMBUSTION GAS FROM COKE OVEN

[75] Inventors: Masaharu Kurokawa, Sakai; Mitsuru Torii, Itami, both of Japan

[73] Assignee: Osaka Gas Company, Ltd., Osaka, Japan

[22] Filed: Oct. 14, 1975

[21] Appl. No.: 622,240

[30] Foreign Application Priority Data

Oct. 16, 1974 Japan .............................. 49-119617

[52] U.S. Cl. .................................. 201/29; 201/27; 201/39
[51] Int. Cl.[2] ......................................... C10B 39/02
[58] Field of Search ........................ 201/27, 29, 39; 423/219

[56] References Cited

UNITED STATES PATENTS

| | | | |
|---|---|---|---|
| 3,316,155 | 4/1967 | Holowaty et al. | 201/39 X |
| 3,512,925 | 5/1970 | Buechler et al. | 423/219 |
| 3,728,230 | 4/1973 | Kemmetmueller | 201/39 |
| 3,888,742 | 6/1975 | Kemmetmueller | 201/39 |

*Primary Examiner*—Morris O. Wolk
*Assistant Examiner*—Michael S. Marcus
*Attorney, Agent, or Firm*—Larson, Taylor and Hinds

[57] ABSTRACT

A method of treating a waste combustion gas from a coke oven comprising the steps of deoxidizing the waste gas, introducing the deoxidized gas into a dry-quenching unit as a gas for quenching red-hot coke, recovering the sensible heat of the red-hot coke given to the gas discharged from the dry-quenching unit for use as a heat source for generating steam and thereafter discharging the gas.

3 Claims, 1 Drawing Figure

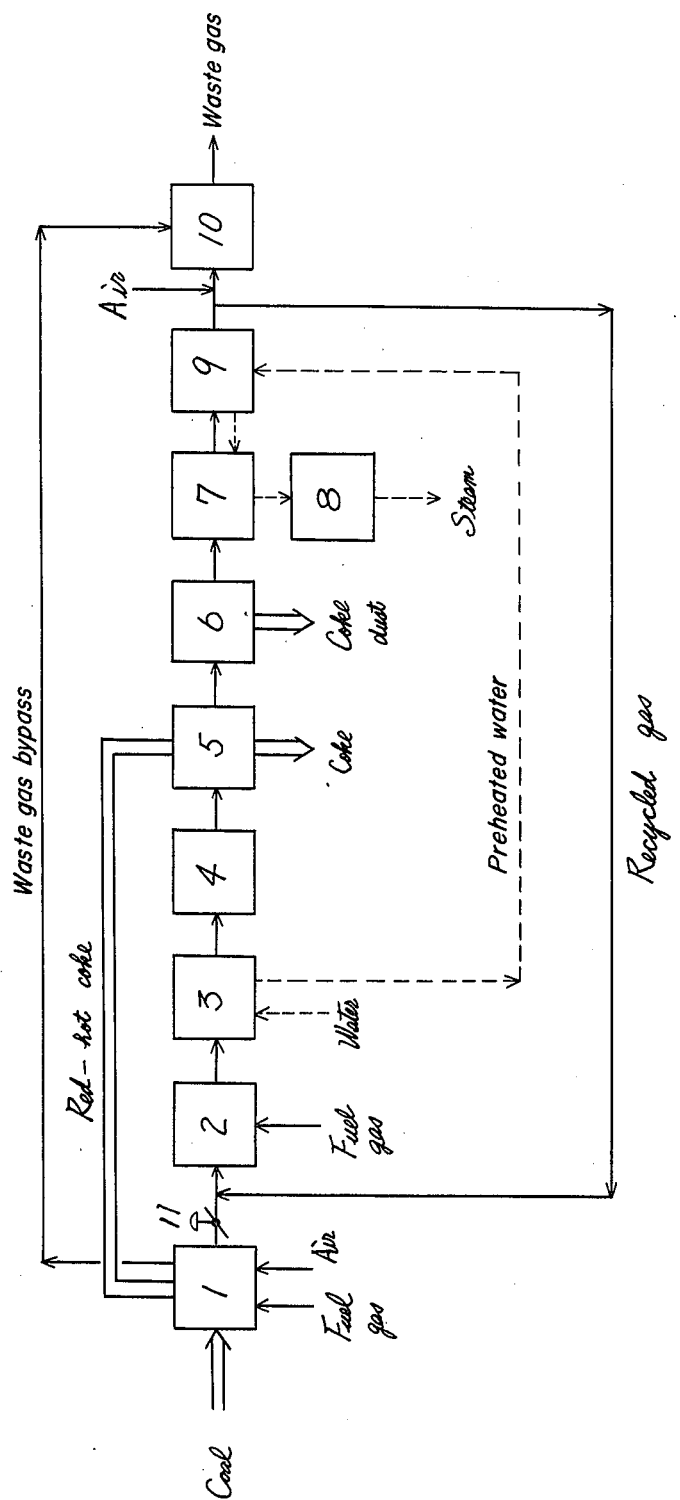

METHOD OF TREATING WASTE COMBUSTION GAS FROM COKE OVEN

This invention relates to a method of treating waste combustion gas exhausted from a coke oven.

Waste combustion gases from coke ovens usually contain about 300 p.p.m. of nitrogen oxides, although the concentration may vary with the type of the oven and operation conditions. Because the coke oven gives off a very large quantity of waste gas, the total quantity of exhausted nitrogen oxides also amounts to a large quantity. The treatment of such a large quantity of waste gas to reduce the nitrogen oxides requires very large-scale equipment whatever method may be employed.

We have carried out various researches to find that when the waste combustion gas from a coke oven is introduced into a dry-quenching apparatus for coke, the gas is effectively serviceable as a gas source for quenching red-hot coke and the nitrogen oxides in the waste gas can also be greatly reduced. Moreover, this method entails another advantage that the sensible heat given to the red-hot coke is effectively recoverable as a heat source for generating steam.

This invention will be described below with reference to the accompanying flow sheet showing the mode of practicing the method of the invention.

A coke oven 1 produces a waste combustion gas, which is sent to a deoxidizing unit 2 and then to a dry-quenching unit 5 by a blower 4. In the unit 5, the deoxidized waste gas deprives red-hot coke of a major portion of its sensible heat, whilst the nitrogen oxides in the waste gas are decomposed. The gas is thereafter led through a dust remover 6 into a boiler 7, in which the sensible heat of the gas is used for generating steam. When required, the heat is stored in a heat accumulator 8. The waste gas from the boiler 7 is sent to a water preheater 9 to preheat the water to be supplied to the boiler and is then run off via a chimney 10. The waste gas line extending from the water preheater 9 may be branched to provide a recycle gas line connected to the inlet of the deoxidizing unit 2, whereby the gas recycled can be utilized for the dry quenching of coke when so desired.

When the deoxidizing unit comprises a layer of oxidizing catalyst maintained at the desired temperature such that the coke oven waste gas and a fuel gas are passed through the layer for combustion, the oxygen in the waste gas can be almost completely eliminated. Useful as oxidizing catalysts are platinum, ruthenium, palladium and like metals, oxides of vanadium, cobalt, copper, nickel, manganese, chromium, etc. These may be used singly, or at least two of them are usable in admixture. More specific examples are "Oxy comb catalyst C" manufactred by Oxy-Catalyst Co., U.S.A. and a catalyst, known as "hopcalite," essentially composed of 50 wt.% of $MnO_2$, 30 wt.% of $CuO$, 15 wt.% of $Co_2O_3$ and 5 wt.% of $AgO$.

When the waste gas is burned as above, the resulting inert gas will inevitably have an increased temperature. It is therefore preferable to pass the gas throgh a primary water preheater 3 to reduce the temperature before the gas is led to the blower 4. In this case, the water preheater 9 disposed subsequent to the boiler 7 serves as a secondary water preheater.

The gas egressing from the dry-quenching unit 5 contains carbon monoxide resulting from the reduction of carbon dioxide gas contained in the waste combustion gas from the coke oven. If the concentratiion of the carbon monoxide gas is at an exceedingly high level, the gas can be completely burned before it is eventually run off from the chimney 10 by supplying secondary air at a required rate. To ensure the oxidation reaction of the gas at a low temperature, an oxidizing catalyst such as stated above may preferably be used.

The operation of coke oven involves gas reversing at an interval of about 30 minutes to achieve a high heat efficiency utilizing the waste heat of heat regenerator. Since the reversing procedure causes variations in the composition of the waste gas, a damper 11 may be closed simultaneously with the initiation of the reversing procedure to run off the waste gas from the chimney 10 via a bypass so that the recycle gas along can be used for the dry quenching of coke. Upon completion of the reversing operation, the damper 11 may be opened to replace the recycle gas by the waste gas for quenching coke. Especially when the waste gas line of the coke oven is provided with an oxygen meter upstream of the damper 11 such that the damper 11 is closable when the amount of oxygen has reached the upper limit of permissible range to automatically switch the gas source to the recycle gas, the method of this invention can be practiced effectively with safety while preventing losses of coke and formation of carbon monoxide.

By appropriately selecting the operation conditions for the deoxidizing unit, the quenching gas can be rendered almost free from oxygen. This substantially eliminates coke losses which would otherwise result from quenching. According to this invention, therefore, it is possible to advantageously utilize the waste combustion gas from the coke oven for quenching red-hot coke to recover the sensible heat of the coke in the form of steam and to extremely lower the nitrogen oxide concentration of the waste gas exhausted from the chimney.

EXAMPLES 1 and 2

The table below gives the results of operations conducted according to the flow sheet.

By being introduced into the dry-quenching unit according to the present method, the waste combustion gas from a coke oven containing 350 p.p.m. of nitrogen oxides can be treated with the remarkable result that the nitrogen oxide concentration is reduced to about one-fifth the original level as will be apparent from the table.

Table

|  |  |  | Example 1 | Example 2 |
|---|---|---|---|---|
| Waste gas from coke oven | Temp. | | 200° C | 200° C |
| | Rate | | 75,000 $Nm^3/h$ | 75,000 $Nm^3/h$ |
| | Comp. | $O_2$ | 4.5 % | 4.5 % |
| | | $CO_2$ | 23.5 % | 12.6 % |

Table-continued

| | | | Example 1 | Example 2 |
|---|---|---|---|---|
| | | $N_2$ | 72.0 % | 82.9 % |
| | | NOx | 350 p.p.m. | 350 p.p.m. |
| Fuel gas fed to deoxidizing unit* | Kind | | Town gas | Town gas |
| | Temp. | | 20° C | 20° C |
| | Rate | | 4,000 Nm³/h | 4,000 Nm³/h |
| Gas discharged from deoxidizing unit | Temp. | | 760° C | 760° C |
| | Comp. | $O_2$ | 0 % | 0 % |
| | | CO₂ | 25.8 % | 14.8 % |
| | | $N_2$ | 74.2 % | 85.2 % |
| | | NOx | 350 p.p.m. | 350 p.p.m. |
| Dry-quenching unit Coke charge | Temp. | | 1,000° C | 1,000° C |
| | Rate | | 36.5 t/h | 36.5 t/h |
| Quenched coke discharge | Temp. | | 330° C | 330° C |
| | Loss | | 10 kg/h | 6 kg/h |
| Gas fed from dust remover to boiler | Temp. | | 480° C | 480° C |
| | | | 79,000 Nm³/h | 79,000 Nm³/h |
| | Comp. | $O_2$ | 0.8 % | 0.5 % |
| | | CO | 3.0 % | 1.5 % |
| | | $CO_2$ | 24.6 % | 14.6 % |
| | | $N_2$ | 71.6 % | 83.4 % |
| | | NOx | 10 p.p.m. | 15 p.p.m. |
| Recovered steam (10 kg/cm², saturated) | Rate | | 30 t/h | 30 t/h |
| Gas from secondary water preheater | Temp. | | 200° C | 200° C |
| | Rate | | 79,000 Nm³/h | 79,000 Nm³/h |
| Secondary air | Temp. | | 20° C | 20° C |
| | Rate | | 6,000 Nm³/h | 3,000 Nm³/h |
| Gas exhausted from chimney | Rate | | 85,000 Nm³/h | 82,000 Nm³/h |
| | Comp. | $O_2$ | 0.9 % | 0.5 % |
| | | $CO_2$ | 21.4 % | 15.3 % |
| | | $N_2$ | 77.7 % | 84.2 % |
| | | NOx | 50 p.p.m. | 55 p.p.m. |

Note:
1. The compositions of the gases listed are all on dry base.
2. *Oxy comb catalyst C (product of Oxy-Catalyst Co., U.S.A.) is used.

What we claim is:

1. A method of treating waste combustion gas from a coke oven containing nitrogen oxides comprising the steps of passing the waste gas to a deoxidizing zone and burning said waste gas with a fuel gas in the presence of an oxidizing catalyst in said deoxidizing zone, introducing the deoxidized gas into a dry-quenching unit, quenching red-hot coke introduced into said dry-quenching unit with said deoxidized gas passing said heated deoxidized gas to a boiler for the recovery of the sensible heat of the red-hot coke given to the deoxidizing gas egressing from the dry-quenching unit for use as a heat source for generating steam, recycling the deoxidized gas from said boiler to said deoxidizing zone for use as a gas for quenching the red-hot coke, said oxidizing catalyst being at least one species selected from the group consisting of platinum, ruthenium, palladium, oxides of vanadium, cobalt, copper nickel, manganese, chromium and silver.

2. A method as defined in claim 1 wherein the heat of combustion of the fuel gas is recovered before the waste gas is introduced into the dry-quenching unit.

3. A method as defined in claim 1 wherein air is supplied to the deoxidized waste gas egressing from the dry-quenching unit and thereafter subjected to heat recovery to burn the carbon monoxide contained in the waste gas in the presence of an oxidizing catalyst.

* * * * *